United States Patent [19]

Morozumi

[11] Patent Number: 5,745,702
[45] Date of Patent: Apr. 28, 1998

[54] APPARATUS AND METHOD FOR INTERCONNECTING ISDN/INTERNETWORK USERS

[75] Inventor: Hisashi Morozumi, Tokyo, Japan

[73] Assignee: NEC Corporation, Tokyo, Japan

[21] Appl. No.: 518,074

[22] Filed: Aug. 22, 1995

[30] Foreign Application Priority Data

Aug. 22, 1994 [JP] Japan .................................. 6-196870

[51] Int. Cl.$^6$ .......................... G06F 15/16; H04L 12/46
[52] U.S. Cl. ................................ 395/200.79; 370/401
[58] Field of Search ....................... 395/200.02, 200.12, 395/200.15, 200.48, 200.57, 200.79; 370/401, 402, 466

[56] References Cited

U.S. PATENT DOCUMENTS

| | | | |
|---|---|---|---|
| 5,208,811 | 5/1993 | Kashio et al. | 370/401 |
| 5,351,237 | 9/1994 | Shinohara et al. | 370/401 |
| 5,425,026 | 6/1995 | Mori | 370/401 |
| 5,442,630 | 8/1995 | Gagliardi et al. | 370/402 |
| 5,519,705 | 5/1996 | Fukutomi | 370/402 |

Primary Examiner—Parshotam S. Lall
Assistant Examiner—Patrice L. Winder
Attorney, Agent, or Firm—Scully, Scott, Murphy & Presser

[57] ABSTRACT

A LAN interconnection apparatus is coupled through a first port to an ISDN and through a second port to a local area network (LAN). Through the ISDN, the apparatus is connected to a remote LAN or an ISDN user. A network address and a host address of an internetwork (such as the Internet) as well as a telephone number of the ISDN are used to uniquely identify remote LANs and ISDN users. A database is provided for associating network addresses with port numbers of the apparatus and associating host addresses with telephone numbers. Upon receipt of a call indication, the apparatus stores a source telephone number contained in the call indication into a lookup table. In response to a packet from the LAN, a port number and a telephone number are detected in the database using a network address and a host address contained in the packet, respectively, as keys. The received packet is then forwarded as a message packet to the port of the detected port number if the detected telephone number is stored in an entry of the lookup table corresponding to the detected port number. The detected telephone number is stored into the lookup table if that number is not stored in the lookup table and the received packet is then forwarded as a call setup packet to the port of the detected port number.

2 Claims, 3 Drawing Sheets

FIG. 2

ROUTING TABLE 12

| DESTINATION NETWORK ADDRESS | NEXT HOP INTERNET ADDRESS | OUTPUT PORT NUMBER |
|---|---|---|
| 1.0.0.0 (ISDN USER) | — | PN1 or PN2 |
| 3.0.0.0 (LOCAL LAN) | — | PN3 |
| 2.0.0.0 (REMOTE LAN) | 1.0.0.2 (PN5) | PN1 or PN2 |
| ⋮ | ⋮ | ⋮ |
| | | |

FIG. 3

HOST-ISDN MAPPING TABLE 13

| DESTINATION HOST ADDRESS | DESTINATION TELEPHONE NUMBER |
|---|---|
| 1.0.0.2 (PN5) | 0123-45-6789 |
| 1.0.0.3 (PN4) | 03-3987-4321 |
| ⋮ | ⋮ |
| | |

FIG. 4

CALL SETUP TABLE 14

| PORT NUMBER | TELEPHONE NUMBER CONTAINED IN CALL SETUP PACKET |
|---|---|
| PN1 | 0123-45-6789 |
| PN2 | |
| PN3 | |

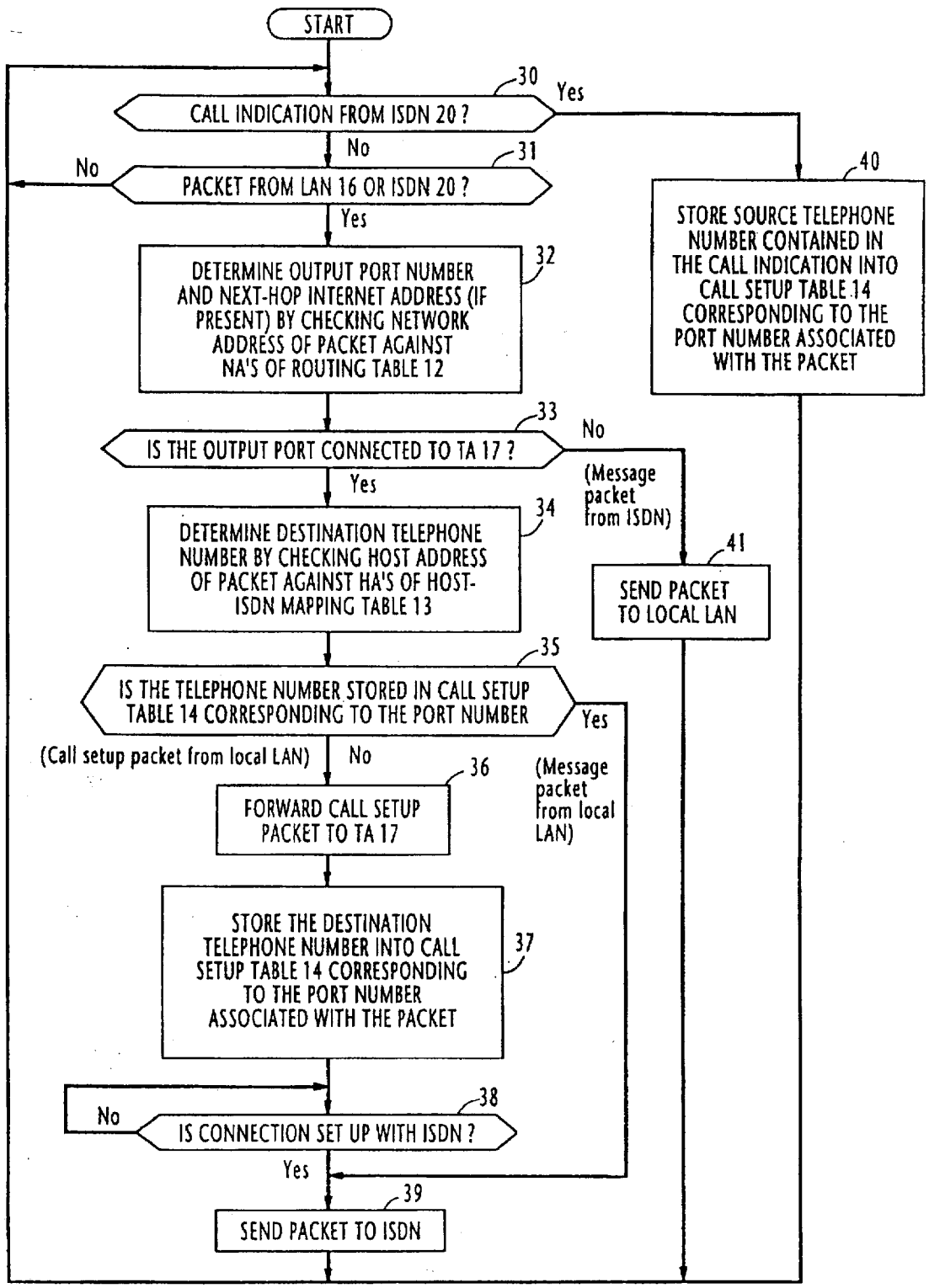

APPARATUS AND METHOD FOR INTERCONNECTING ISDN/ INTERNETWORK USERS

BACKGROUND OF THE INVENTION

1. Field of the Invention

The present invention relates generally to inter-LAN (local area network) communication systems, and more particularly to an apparatus and method for interconnecting ISDN (integrated services digital network) and internetwork (such as the Internet) users.

2. Description of the Related Art

For establishing a connection between LANs through an ISDN network or a connection between a LAN and an ISDN user, a device known as a "terminal adapter" is used for interfacing the LAN to the ISDN if the LAN is of non-ISDN type as specified in the CCITT Recommendation V.25 bis. If the LANs and the ISDN users are users of an internetwork such as the Internet, each user is assigned a network address and a host address of the Internet in addition to a telephone number of the ISDN. There is often a need for a local Internet user to authenticate a request from a remote Internet user to prevent unauthorized access to the resource of the local user. Specifically, when a connection is established in response to a request from the remote user, the local user must determine whether a packet is to be returned to the remote station. In the case of a connection established in response to a request from the local Internet user, a destination telephone number is determined by using a database which associates Internet addresses with telephone numbers and port numbers of the local user with telephone numbers of communicating parties. However, in the case of a connection established in response to a request from a remote user, authentication protocols such as Challenge Handshake Authentication Protocol (CHAP) are currently used as an option of point-to-point protocol (PPP). These protocols are exchanged between the calling and called parties for identification of the caller. However, the exchanging of such authentication protocols results in a substantial amount of delays.

SUMMARY OF THE INVENTION

It is therefore an object of the present invention to provide an apparatus and method for interconnecting ISDN/ internetwork users that simplifies connection procedure and reduces the amount of time taken to establish a connection to remote users.

The present invention provides an apparatus for interconnecting a LAN (local area network) and remote stations through an integrated services digital network (ISDN), wherein each of the LAN and remote stations is a user of an internetwork and is assigned a network address and a host address of the internetwork and a telephone number of the ISDN. The apparatus comprises a first port connected to the LAN and a second port connected to the ISDN, where the first and second ports are respectively identified by a port number. In a database, a plurality of first entries are defined to associate network addresses with the port numbers and a plurality of second entries are defined to associate host addresses with telephone numbers. A lookup table is provided having a plurality of entries corresponding to the port numbers. In response to receipt of a call indication signal through the second port, a source telephone number contained in the call indication signal is stored into an entry of the lookup table corresponding to the port number of the first port. In response to receipt of a packet from the LAN, a port number is detected in an entry of the database corresponding to a network address contained in the received packet, and a telephone number is detected in an entry of the database corresponding to a host address contained in the packet. The received packet is forwarded as a message packet to the port of the detected port number if the detected telephone number is stored in an entry of the lookup table corresponding to the detected port number. The detected telephone number is stored into an entry of the lookup table corresponding to the detected port number if the detected telephone number is not stored in the entry of the lookup table and the received packet is forwarded as a call setup packet to the port of the detected port number.

BRIEF DESCRIPTION OF THE DRAWINGS

The present invention will be described in further detail with reference to the accompanying drawings, in which:

FIG. 2 shows a routing table forming part of a database;

FIG. 3 shows a host-ISDN mapping table forming part of the database;

FIG. 4 shows a call setup table for storing telephone numbers when establishing a connection with the ISDN; and FIG. 5 is a flowchart of programmed instructions performed by a controller of the interconnection apparatus.

DETAILED DESCRIPTION

Figure 1:
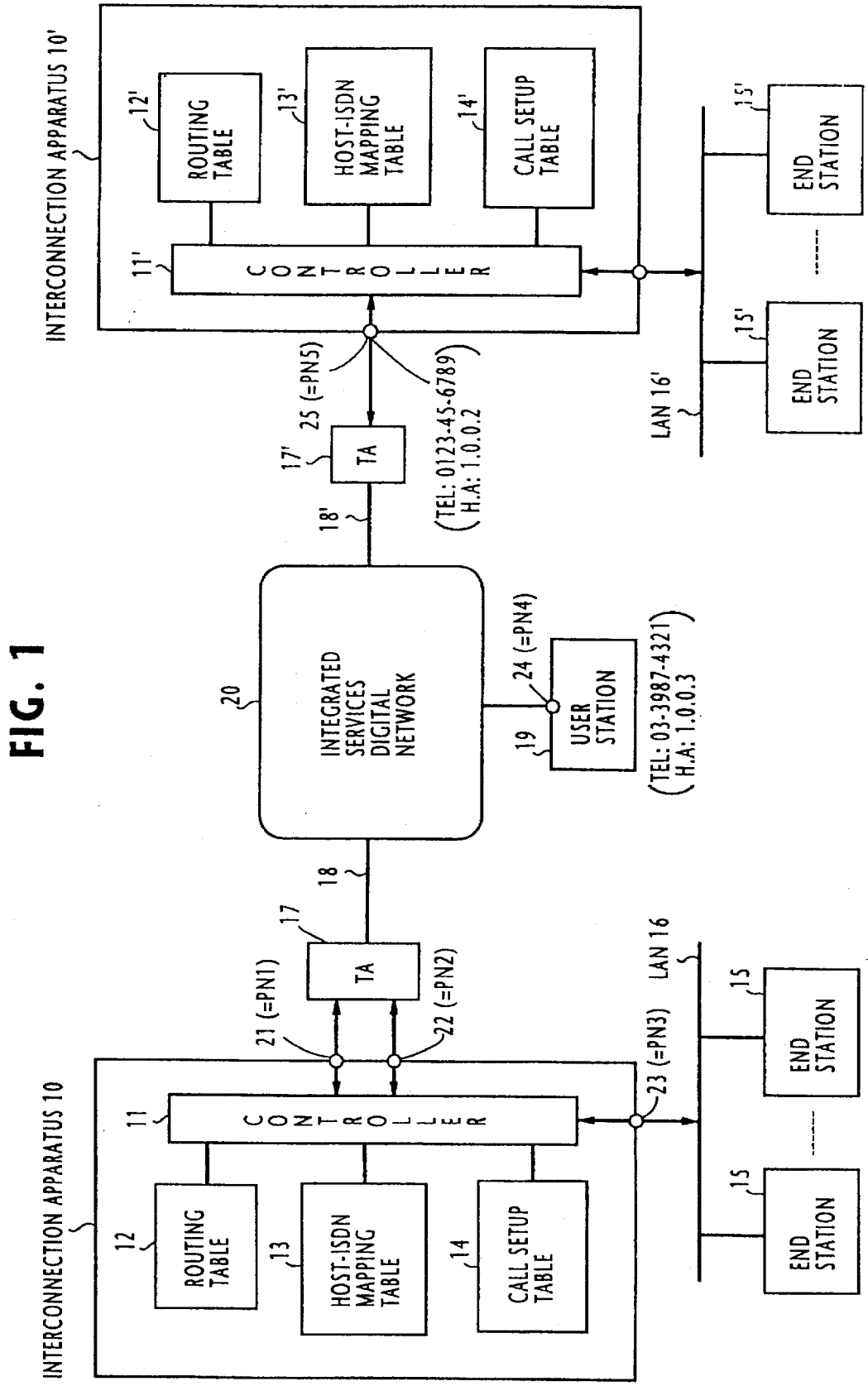
FIG. 1 is a block diagram of an inter-LAN communication network through an ISDN, using interconnection apparatus of the present invention.

Referring now to FIG. 1, an inter-LAN network embodying the present invention is illustrated for communication between a local LAN 16 and remote stations, including a LAN 16' and an ISDN (integrated services digital network) user station 19, via an ISDN 20. Local LAN 16 serves a plurality of end user stations 15. A LAN interconnection apparatus 10 such as a router is connected between LAN 16 and ISDN 20. Each of the LANs and ISDN user station is a user of an internetwork such as the Internet and assigned a network address and a host address of the Internet and a telephone number of the ISDN. For purposes of description, the ISDN user station 19 is identified by telephone number "03-3987-4321" and an Internet host address "1.0.0.3" and the remote router 10' at port 25 is identified by a telephone number "012345-6789" and an Internet host address "1.0.0.3".

The router's connection to LAN 16 is via a port (interface) 23 with port number PN3 and the connection to the ISDN is via a terminal adapter 17 through a port 21 or a port 22 which are identified by port numbers PN1 and PN2, respectively. The router 10 includes a routing table 12, a host-ISDN mapping table 13 and a call setup table 14. A controller 11 is associated with these tables for routing packets either received from the ISDN 20 or the local LAN 16 and is connected to ports 21, 22 and 23. Terminal adapter 17, which is the device that interfaces a non-ISDN device to the ISDN, is connected via a channel medium 18 to the ISDN 20. Similar to the local LAN, the remote LAN 16' serves a plurality of end users 15' and is connected to the router 10' having corresponding functional elements to those in router 10 marked by primed but corresponding numerals to those of local router 10. Remote router 10' is connected through a port 25 with port number PN5 to terminal adapter 17' for interfacing the router 10' and the ISDN via channel medium 18'. The ISDN user station 19 is connected to the ISDN 20 via port 24 with port number PN4 as a representative of the many user stations.

Details of the routing table 12, host-ISDN mapping table 13 and call setup table 14 of local router 10 are shown in FIGS. 2, 3 and 4, respectively.

As shown in FIG. 2, the routing table 12 associates, for each Internet user, a destination network address of the Internet with a next hop Internet address (if present) and with an output port number. The ISDN user station 19 is assigned a network address 1.0.0.0 and is mapped to port number PN1 or PN2 depending on which port is used for establishing a connection. Since there is no next hop Internet address for the ISDN user 19, the next hop entry is left vacant. The local LAN 16 is assigned an Internet network address 3.0.0.0 and is mapped to port number PN3 of local router 10, and the remote LAN 16' is assigned a network address 2.0.0.0 and mapped to next hop Internet address 1.0.0.2 (with port number PM5) which corresponds to the host address of port 25 at remote router 10' and to the port number PN1 or PN2 of local router 10. The contents of routing table 12 may be prepared by exchanging protocol packets between LANs 16 and 16'.

In FIG. 3, the host-ISDN mapping table 13 maps, for each remote port number, a destination host address and a destination ISDN telephone number. Thus, in the entry for port number PN5, the Internet host address "1.0.0.2" and the ISDN telephone number "012345-6789" are stored, and in the entry for port number PN4, the Internet host address "1.0.0.3" and the ISDN telephone number "03-3987-4321" are stored, The call setup table 14, FIG. 4, associates each of the local port numbers at terminal adapter 17 with an ISDN telephone number contained in a call setup packet received either from the ISDN or from the local LAN when a connection is to be established. In FIG. 4, it is shown that a call indication has been received from the ISDN 20 through port 21 in response to a request from remote LAN 16' and the telephone number of this LAN is extracted from the call indication and stored in an entry corresponding to port number PN1.

The controller 11 of the local router operates in accordance with the flowchart of FIG. 5. The operation starts with decision block 30 where the controller 11 checks to see if a call indication is received from ISDN 20 at one of the ports 21 and 22 of terminal adaptor 17. The call indication contains a source network address and a source host address in the respective network identifier field and host identifier field of the signal as well as a source ISDN telephone number. If a call indication is received, flow proceeds from block 30 to block 40 where the controller determines which of the ports 21, 22 and 23 the call indication is received and extracts the source ISDN telephone number from the call indication signal and stores it into an entry of the call setup table 14 that corresponds to the port number determined for the call indication signal, and flow returns to block 30.

If the decision at block 30 is negative, flow proceeds to block 31 where the controller asks whether a message packet from the ISDN or a call setup or message packet from the local LAN is received. If none of such packets is received, flow returns to block 30 to repeat the test, and if any of such packets is received, flow proceeds to block 32 where the controller looks up the routing table 12 and searches for an entry containing the same destination network address as that contained in the packet. If such an entry is detected, the controller determines, for the received packet, the next hop Internet address and the output port number stored in that entry.

Decision block 33 is the next inquiry to determine whether or not the port bearing the determined port number is connected to the terminal adapter 17. If the received packet is a message packet from the ISDN user station 19 or remote LAN 16', port number PN3 is determined for the incoming message packet. Since the port bearing the port number PN3 is not connected to the terminal adapter 17, the decision at block 33 is negative and flow proceeds from block 33 to block 41 where the controller forwards the incoming message packet to the local LAN through the port 23 identified by the determined port number PN3.

If the received packet is an outgoing call setup or message packet from the local LAN, port number PN1 or PN2 is determined for such a packet. In this case, since the port bearing the determined port number PN1 or PN2 is connected to the terminal adapter 17, the decision at block 33 is affirmative and flow proceeds to block 34 where the controller searches the host-ISDN mapping table 13 using a destination host address contained in the packet as a key and detects an entry where the same host address is stored. If such an entry is detected, the controller determines, for the outgoing packet, the destination ISDN telephone number stored In that entry.

In decision block 35, the controller looks up the call setup table 14 and checks to see if there is an ISDN telephone number corresponding to the port number determined for the outgoing packet. If no destination ISDN telephone number is stored in the call setup table 14 for the outgoing packet, it is determined that the packet from the local LAN is an outgoing call setup packet and flow proceeds from block 35 to block 36 where the controller forwards the packet to terminal adapter 17 to establish a connection.

Exit then is to block 37 where the controller stores the destination telephone number determined at block 34 into an entry of the call setup table 14 corresponding to the port number determined for the packet. Flow proceeds to block 38 to check to see if a connection is established with the ISDN 20. If so, flow proceeds from block 38 to block 39 to send the outgoing call setup packet to ISDN 20, and then returns to block 30.

If a telephone number is detected, in decision block 35, in the call setup table 14 corresponding to the port number determined for the received packet, it is concluded that the packet is an outgoing message packet and control proceeds from block 35 to block 39 to forward the packet to the port identified by the determined port number, i.e., PN1 or PN2

The foregoing description shows only one preferred embodiment of the present invention. Various modifications are apparent to those skilled in the art without departing from the scope of the present invention which is only limited by the appended claims.

What is claimed is:

1. An apparatus for interconnecting a LAN (local area network) and remote stations through an integrated services digital network (ISDN), each of said LAN and remote stations being a user of an internetwork and being assigned a network address and a host address of the internetwork and a telephone number of the ISDN, the apparatus comprising:

a first port connected to the LAN and a second port connected to the ISDN, said first and second ports being respectively identified by a port number;

a database having a plurality of entries associating network addresses with said port numbers and a plurality of entries associating host addresses with telephone numbers;

a lookup table having a plurality of entries corresponding to said port numbers; and control means for (a) receiving a call indication signal through the second port and storing a source telephone number contained in the call indication signal into an entry of the lookup table corresponding to the port number of the second port, (b) receiving a packet from the LAN, detecting a port number in an entry of the database corresponding to a network address contained in the received packet, detecting a telephone number in an entry of the database corresponding to a host address contained in the packet and forwarding the received packet as a message packet to the port of the detected port number if the detected telephone number is stored in an entry of the lookup table corresponding to the detected port number, and storing the detected telephone number into an entry of the lookup table corresponding to the detected port number if the detected telephone number is not stored in said entry of the lookup table and forwarding the received packet as a call setup packet to the port of the detected port number.

2. In an apparatus having a first port connected to an Integrated services digital network (ISDN) and a second port connected to a LAN (local area network) for exchanging packets with remote stations through the ISDN, each of said LAN and remote stations being a user of an internetwork and assigned a network address and a host address of the internetwork and a telephone number of the ISDN, said first and second ports being identified by a respective port number, a communication method comprising the steps of:

a) storing network addresses and said port numbers in respective entries of a database and storing host addresses and telephone numbers in respective entries of the database;

b) receiving a signal through one of the first and second ports and determining a type of the received signal;

c) if the received signal is determined to be a call indication signal from the ISDN, storing a source telephone number contained in the received signal into an entry of a lookup table corresponding to the port number of the first port;

d) if the received signal is determined to be a packet from the LAN, detecting a port number in an entry of the database corresponding to a network address contained in the received packet and detecting a telephone number in an entry of the database corresponding to a host address contained in the received packet, and determining whether or not the detected telephone number is stored in an entry of said lookup table corresponding to the detected port number;

e) if the detected telephone number is determined to be not stored in said lookup table, storing the detected telephone number into said entry of the lookup table and forwarding the received packet as a call setup packet to the port of the detected port number; and f) if the detected telephone number is determined to be stored in said entry of said lookup table, forwarding the received message packet as a message packet to the port of the detected port number.

* * * * *